United States Patent
Jolma et al.

(10) Patent No.: US 7,424,299 B1
(45) Date of Patent: Sep. 9, 2008

(54) SYSTEM AND METHOD FOR SLOT ALLOCATION WITH REDUCED NEED FOR MEASUREMENT

(75) Inventors: Petri Jolma, Espoo (FI); Kalle Passoja, Espoo (FI); Otto Lehtinen, Raisio (FI); Petri Patronen, Oulu (FI)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 09/658,731

(22) Filed: Sep. 11, 2000

(51) Int. Cl.
H04Q 7/20 (2006.01)

(52) U.S. Cl. .......... 455/450; 455/452.1; 455/452.2; 455/509; 370/468; 370/337; 370/442; 370/331; 375/148; 375/346

(58) Field of Classification Search .......... 455/450, 455/452.1–452.2, 67.11, 67.13, 561, 509; 370/329, 333, 468, 252, 328, 336, 337, 280, 370/294, 321, 347, 442, 478, 395.4, 395.41, 370/395.42; 375/147, 148, 346
See application file for complete search history.

(56) References Cited

U.S. PATENT DOCUMENTS

| | | | | |
|---|---|---|---|---|
| 4,949,336 A | * | 8/1990 | Hamada et al. ......... 370/460 |
| 5,044,010 A | * | 8/1991 | Frenkiel et al. ........ 455/464 |
| 5,163,047 A | * | 11/1992 | Perdikaris et al. ...... 370/401 |
| 5,299,199 A | * | 3/1994 | Wilson et al. .......... 370/347 |
| 5,351,240 A | * | 9/1994 | Highsmith ............. 370/461 |
| 5,371,780 A | * | 12/1994 | Amitay ................ 455/450 |
| 5,375,123 A | * | 12/1994 | Andersson et al. ...... 370/333 |
| 5,410,737 A | * | 4/1995 | Jones ................. 455/454 |
| 5,491,837 A | * | 2/1996 | Haartsen .............. 455/62 |
| 5,574,979 A | * | 11/1996 | West .................. 455/63.1 |
| 5,594,738 A | * | 1/1997 | Crisler et al. ........ 370/347 |

(Continued)

FOREIGN PATENT DOCUMENTS

EP 0 782 361 7/1997

(Continued)

OTHER PUBLICATIONS

Al Agha K. et al: "Channel segregation for slot assignment in integrated voice and data systems" Personal, Indoor And Mobile Radio Communications, 1998. The Ninth IEEE International Symposium on Boston, MA, USA Sep. 8-11, 1998, New York, NY USA, IEEE, US, Sep. 8, 1998, pp. 831-835, XP010314581.

(Continued)

Primary Examiner—Sharad Rampuria
(74) Attorney, Agent, or Firm—Harrington & Smith, PC

(57) ABSTRACT

In a communication system in which mobile terminals may roam throughout an area with a plurality of base stations with overlapping coverages and wherein the base stations employ multiplexed slots all in the same frequency range, a system and method for allocating slots based on the quality classes of the transmitted traffic wherein certain slots are assigned as owned by some base stations and certain other slots are assigned as shared between base stations. Slots assigned as owned by a base station are assigned as avoided by adjacent base stations. When assigning a slot for communication from a mobile terminal, the number of slot quality measurements that must be made in order to find a slot with interference below an acceptable level is reduced, compared to conventional dynamic slot allocation schemes.

20 Claims, 2 Drawing Sheets

U.S. PATENT DOCUMENTS

| | | | |
|---|---|---|---|
| 5,606,729 A * | 2/1997 | D'Amico et al. | 455/67.1 |
| 5,722,043 A | 2/1998 | Rappaport et al. | |
| 5,787,346 A * | 7/1998 | Iseyama | 455/439 |
| 5,787,352 A * | 7/1998 | Benveniste | 455/452.2 |
| 5,831,976 A * | 11/1998 | Lin et al. | 370/329 |
| 5,886,993 A * | 3/1999 | Ruszczyk et al. | 370/451 |
| 5,894,472 A * | 4/1999 | de Seze | 370/337 |
| 5,926,763 A | 7/1999 | Greene, Sr. et al. | 455/450 |
| 5,943,340 A * | 8/1999 | Iemura | 370/431 |
| 5,963,848 A * | 10/1999 | D'Avello | 455/62 |
| 5,987,021 A * | 11/1999 | Erickson et al. | 370/347 |
| 5,999,818 A * | 12/1999 | Gilbert et al. | 455/448 |
| 6,101,193 A * | 8/2000 | Ohba | 370/429 |
| 6,115,360 A * | 9/2000 | Quay et al. | 370/235 |
| 6,128,498 A * | 10/2000 | Benveniste | 455/450 |
| 6,405,043 B1 * | 6/2002 | Jensen et al. | 455/446 |
| 6,418,317 B1 * | 7/2002 | Cuffaro et al. | 455/450 |
| 6,438,376 B1 * | 8/2002 | Elliott et al. | 455/437 |
| 6,442,164 B1 * | 8/2002 | Wu | 370/395.21 |
| 6,469,991 B1 * | 10/2002 | Chuah | 370/329 |
| 6,493,331 B1 * | 12/2002 | Walton et al. | 370/341 |
| 6,570,849 B1 * | 5/2003 | Skemer et al. | 370/230.1 |
| 6,570,883 B1 * | 5/2003 | Wong | 370/412 |
| 6,701,149 B1 * | 3/2004 | Sen et al. | 455/436 |
| 6,728,300 B1 * | 4/2004 | Sarkar et al. | 375/147 |
| 6,891,847 B1 * | 5/2005 | Gubbi | 370/442 |
| 6,907,243 B1 * | 6/2005 | Patel | 455/442 |

FOREIGN PATENT DOCUMENTS

EP  0 866 628 A2  9/1998

OTHER PUBLICATIONS

Katzela et al.: "Channel Assignment Schemes for Cellular Mobile Telecommunication Systems: A Comprehensive Survey" IEEE Personal Communications, IEEE Communications Society, US, vol. 3, No. 3, Jun. 1, 1996 pp. 10-31, XP000593925.

\* cited by examiner

Note 1: For each owned slot not in use by BS 2-3
Note 2: For each shared slot not in use by BS 2-3
Note 3: For each avoided slot not in use by BS 2-3 or by its owner

SYSTEM AND METHOD FOR SLOT ALLOCATION WITH REDUCED NEED FOR MEASUREMENT

BACKGROUND OF THE INVENTION

1. Field of the Invention

The present invention relates to a multiplexed radio system with a plurality of base stations having overlapping coverage areas, and particularly to the dynamic apportionment of channels in a multiplexed radio system.

2. Description of the Related Art

In many communication applications, a user with a mobile terminal communicates via a relatively short range radio link with a base station, which may pass his communication to other proximate mobile terminals via the short range link, or which may pass his communication to other base stations or to networks such as the PSTN.

In many such applications a user may roam throughout an area larger than the reliable coverage area of a single base station, yet the user may wish to maintain his communication capability as he roams. Typically, multiple base stations with overlapping coverage areas are provided for such applications.

Since a great many communication services are in place or contemplated, space in the radio spectrum is quite scarce. Thus, while it might be desirable for each base station to have frequencies allocated for its own exclusive use, multiple base stations must operate within lower spectrum bandwidth than ideal, and in many instances must share frequencies. Yet, this must be accomplished while minimizing interference between communication channels, i.e., timeslots in a time-multiplexed system, such as a UMTS/TDD radio system.

Typically, each base station has a number of slots on which it is capable of communicating with mobile stations. In typical conventional systems, when a mobile station wishes to initiate communication the associated base station makes path-loss and interference measurements on each of the slots that it is not presently using, in order to find a slot not being seriously interfered with by another base station or a mobile station.

An existing example of a radio communication system with dynamic channel apportionment is the DECT (Digital European Cordless Telephone) system in which the mobile terminal chooses the slot to be used for communication, without any consideration of the type or quality class (QoS class) of service. There is a need for faster and more reliable operation with more optimal radio resource usage, especially when the requirements of the traffic become more diverse with data and multi-media transmissions.

SUMMARY OF THE INVENTION

An object of the present invention is to reduce the number of slots measured by a base station or a mobile station in order to find a slot not interfered with by another base station or mobile station, and to direct measurements to particular slots determined according to the needed quality class of the communication.

According to one aspect of the invention, a centralized set of information is assembled indicative of the interference patterns among the transmitters (be they base stations or mobile stations) of a particular installation. A slot on which it is found that base stations interfere with each other is assigned as "owned" by one of the base stations and as "avoided" by the other base stations interfered with. A slot on which two adjacent base stations would interfere with each other but is not assigned as owned by either of them is assigned as "shared" by those two base stations. When a slot is to be allocated for communication between a base station and a mobile station, the base station's owned slots that are not presently in use are measured (path-loss measurements are taken) first in an attempt to find one not being interfered with by any other transmitter. If such a slot is found, the communication is assigned to it. If no such owned slot is available, shared slots are measured to find one not interfered with by another transmitter; if one is found, it is used.

In another aspect of the invention, if no owned or shared slot is available, avoided slots will be measured to determine if one is not in use by the owning base station; if one such is found, it is used.

In another aspect of the invention, communications which do not have a high quality class requirement are assigned only to shared or avoided slots while owned slots are reserved for communications with high quality class requirement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PREFERRED EMBODIMENTS

Figure 1:
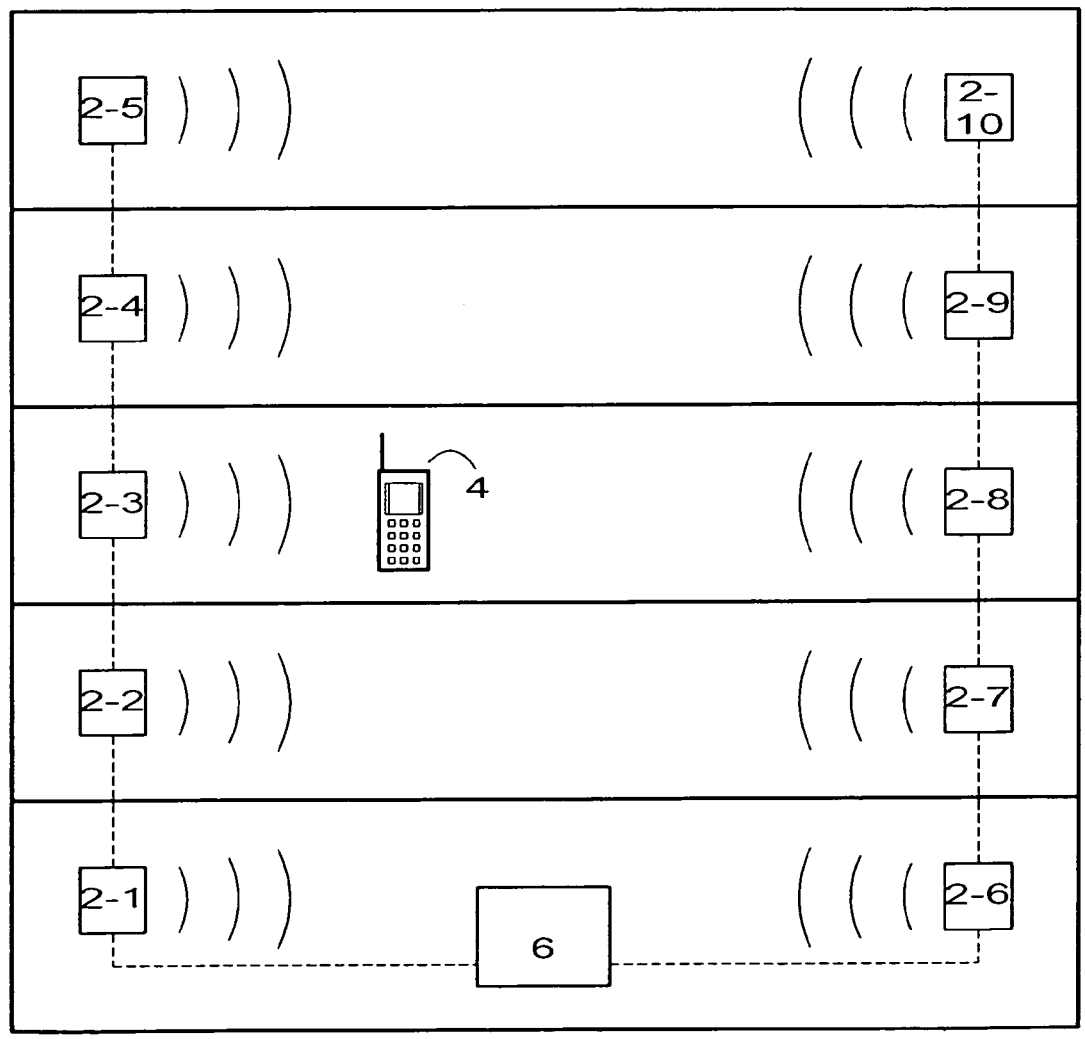
FIG. 1 is a block diagram of an environment in which the present invention is deployed.

FIG. 1 depicts a typical environment in which the present invention is useful. A system 10 is deployed in a building which might be an office building, a factory building, a department store, etc. The exemplary embodiment of FIG. 1 depicts a 5-story building, although nothing implicit in the invention constrains it to any particular number of stories or even to deployment in a building; it might, for example, be deployed on terrain, in a plurality of buildings, or in one or more buildings in conjunction with adjacent terrain.

It is desired that users equipped with mobile terminals 4 (of which there typically are many, only one of which is shown in FIG. 1) can always be in communication through the system 10 no matter where they may roam within the system 10. Communication from a mobile terminal 4 is through a base station (BS) 2. Since the system 10 occupies an area larger than the reliable coverage area of a single BS 2, a plurality of BSs 2 are provided. In the exemplary embodiment of FIG. 1, there is a BS 2 near each end of each story of the five-story building, for a total of ten BS 2s denominated 2-1 through 2-10. In accordance with the present invention, a controller 6 is located somewhere in system 10 and has a connection to each of BSs 2. In a present embodiment, the connection is by means of wiring.

A present embodiment of the invention is in a time-division duplex (TDD) system conforming to the Universal Mobile Telecommunication System (UMTS) specification, thus known as a UMTS/TDD system, but the invention is suitable to other systems in which a plurality of transmitters might interfere with one another. All BSs 2 can transmit on the same frequency band, and each BS 2 employs fifteen time-division slots, connoted slots 1 through 15. Taking BS 2-3 as exemplary, an initial assessment might be arbitrarily made that slots of BSs 2-2, 2-4, and 2-8 interfere with BS 2-2. That assessment can be refined over time based on empirical observation. Empirical observation may also indicate that some slots of some BSs other than 2-2, 2-4, and 2-8 interfere with BS 2-3.

Based on the current assessment, slots of each BS are assigned as one of owned, shared, or avoided. For example, slots 1, 2, and 3 might be assigned as owned by BS 2-3. Slots 4, 5, and 6 might be assigned as owned by BS 2-2; they would thus be assigned as avoided by BS 2-3. Slots 7, 8, and 9 might be assigned as owned by BS 2-4; they would thus be assigned as avoided by BS 2-3. Slots 10, 11, and 12 might be assigned as owned by BS 2-8; they would thus be assigned as avoided by BS 2-3. Slots 13, 14, and 15 would then be assigned as shared by BS 2-3.

When a user requests to initiate communication via mobile terminal 4 (which is in BS 2-3's coverage area), BS 2-3 must allocate a slot for the communication. BS 2-3 determines what slot to use by making path loss measurements between itself and mobile terminal 4 and interference measurements at various slots. The first slots to be tried are those assigned as owned by BS 2-3 (slots 1, 2, and 3 in the present example) and not already in use. If at least one of slots 1, 2, and 3 is not presently in use, the probability is very high that it will be found to be free of interference, since it was assigned as avoided by adjacent base stations. It is thus likely that a usable slot will be found after far fewer measurements than under the prior-art method in which all slots are measured until a usable one is found.

However, if slots 1, 2, and 3 are all in use by BS 2-3, or are found to have excessive interference (which might be because of a peculiarity of the present position of mobile terminal 4 or because an adjacent transmitter is using the slot under special permission from controller 6 as will be described below), the slots assigned as shared by BS 2-3 are measured (slots 13, 14, and 15 in the present example). If one of them is found to be sufficiently free of interference, it is used for the communication.

In another embodiment of the invention, the quality class required for the communication affects the order of slot measurement. Real-time transmission, for example, requires a high quality class, since lost data are not automatically recovered. Packet data, on the other hand, is transmissible under a lower quality class, since typical protocols automatically retransmit packets which have undergone transmission errors. The term "quality class" is being used herein to connote what is generally known as QoS (quality of service) class. In this embodiment, communications requiring a high quality class start measuring in the slots assigned as owned by a BS, but communications not requiring a high quality class start measuring in the slots assigned as shared by a BS, thus permitting the owned slots (with their higher probability of low interference) to remain available for subsequent high quality class transmissions.

In another embodiment of the invention, if neither a BSs owned slots nor its shared slots are available and suitably interference free, controller 6 may grant special permission to a BS to use a slot marked as avoided by that BS and owned by another BS, if controller 6 determines that the other BS is not presently using the slot.

Figure 2:
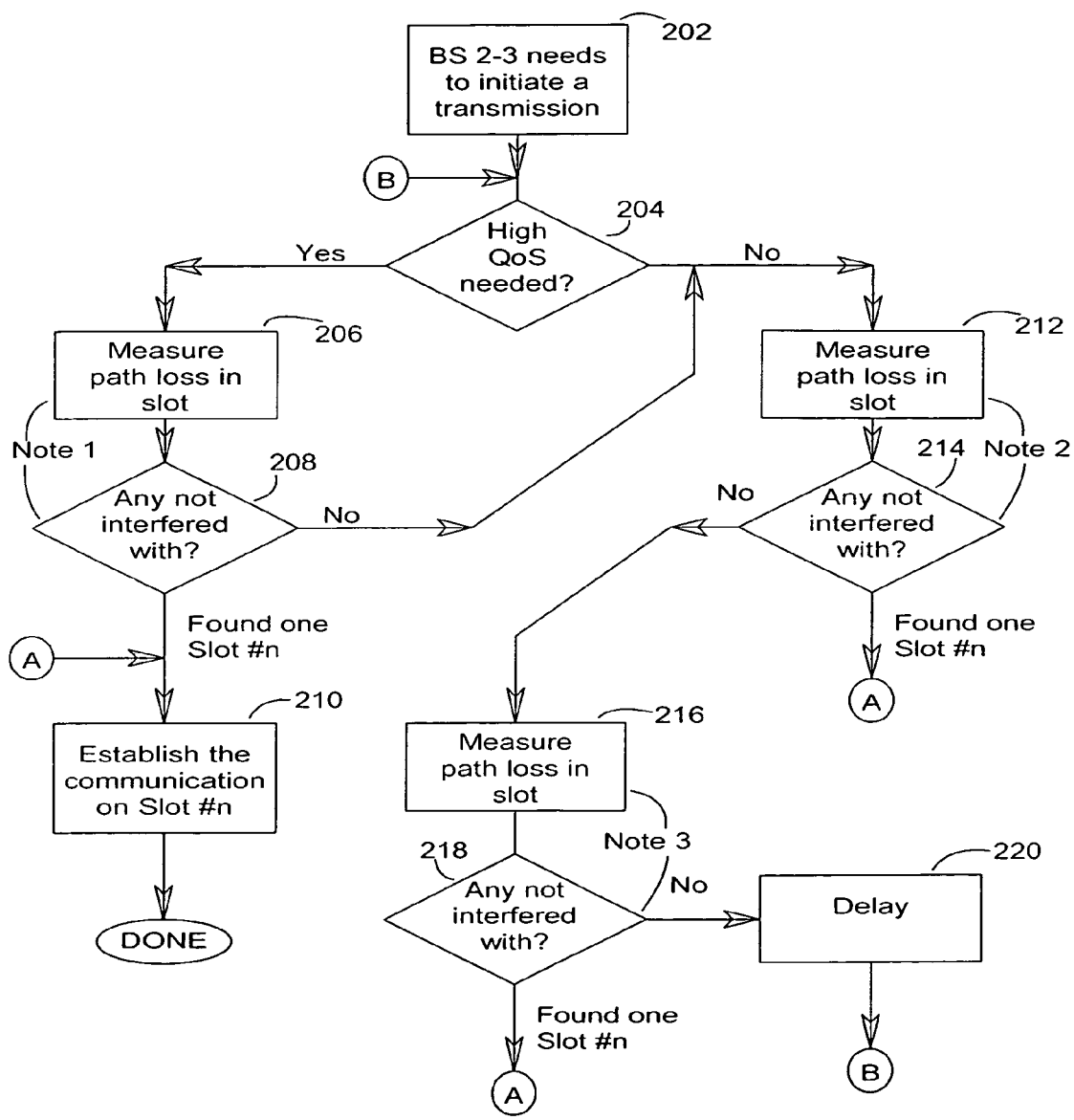
FIG. 2 is a flow chart of slot allocation according to the present invention.

FIG. 2 is a flowchart of initiating a communication according to the present invention. A request indicated to a BS from a user at a mobile terminal 4 (such as by putting the mobile terminal into an off-hook condition) initiates the flow. The flow centers on a particular one of the BSs, namely the particular BS in whose coverage area a mobile terminal 4 is located when requesting to initiate communication. In the present example, a mobile terminal 4 requesting to initiate communication is in the coverage area of BS 2-3, so BS 2-3 will be treated as central in the present example. The flow of FIG. 2 is entered at block 202. In block 204 it is determined whether a high quality class path is needed. (In some embodiments the check of block 204 may be omitted; control may dispatch directly from block 202 to block 206, and all communications regardless of quality class requirement will be tried on owned slots first.) Blocks 206 and 208 may be repetitively looped through (as indicated by Note 1 on FIG. 2). For each slot owned by BS 2-3 but not currently in use by it, path loss measurements are made in block 206 and the results are evaluated at block 208. As soon as a slot is found with acceptably low interference (indicated by a path loss measurement meeting predetermined criteria) control dispatches block 210 where the communication is established on that slot.

If no owned slots are found with suitably low interference, shared slots are tried next by dispatching to block 212. Blocks 212 and 214 may execute repetitively in the manner of blocks 206 and 208, but for BS 2-3's shared slots. If one is found with suitably low interference, block 210 is reached (through connector "A") and communication is initiated on the found slot.

If control dispatches to block 216, none of BS 2-3's owned slots or shared slots are available for use. Controller 6 (FIG. 1) is interrogated (the interrogation is not shown in FIG. 2) to determine whether any of BS 2-3's avoided slots (which would be slots assigned as owned by other BSs) are in use by their owners, and whether it is permitted for BS-3 to use such slots at this time. If there are any such slots, blocks 216 and 218 may execute repetitively to find one with suitably low interference. Finding one dispatches to block 210 to initiate communication on that slot. Failure to find one indicates that there are no slots at all available to BS 2-3 at this time. Control dispatches to block 220, and after some predetermined delay time control dispatches back to the beginning of the flow (through connector "B") to try again, on the premise that a communication on some slot may have terminated thus making the slot available, or the interference on some slot may have abated. Not shown in FIG. 2 is that if the user terminates his request to establish communication (as by putting mobile terminal 4 back in an on-hook condition) the flow of FIG. 2 is abandoned.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:

determining, for each base station of a plurality of base stations capable of communicating with at least one mobile station via any of a group of slots in a communication system, a classification for each slot of the group of slots according to a probability of interference with other base stations of the plurality of base stations, comprising assigning as owned by one of said base stations and as avoided by other of said base stations a first slot in which said other base stations interfere with said one base station, assigning as owned by individual ones of said other base stations and as avoided by said one base station other slots in which said individual ones of said other base stations interfere with said one base station, and assigning as shared by said one base station and another of said other base stations a shared slot in which said another of said other base stations interferes with said one base station if used simultaneously with said one base station and which are not assigned as owned by any of the base stations; and allocating on request a slot whose determined classification matches a desired quality class of the request.

2. The method of claim 1, wherein each said slot is a time slot.

3. The method of claim 1, wherein:

the communication system further includes a controller connected to each base station;

said predetermination for each base station is reported to the controller; and said allocating is performed in the controller.

4. The method of claim 1, further comprising:

reporting the determined classification to a controller in the communication system, wherein the controller allocates the slots and maintains an indication of which slots are currently allocated for each base station.

5. The method of claim 4, wherein:

if neither an owned slot nor a shared slot of a first base station is available for a requested communication, the controller determines whether any avoided slot of the first base station is not in use by a second base station owning that slot, and if so, that slot is allocated for the requested communication.

6. The method of claim 2 wherein the step of allocating is further according to location of a mobile station to be communicated with.

7. Apparatus comprising a logic unit configured to:

determine, for each base station of a plurality of base stations capable of communicating with at least one mobile station via any of a group of slots in a communication system, a classification for each slot of the group of slots according to a probability of interference with other base stations of the plurality of bases stations and to assign as owned by one of said base stations and as avoided by other of said base stations a first slot in which said other base stations interfere with said one base station, to assign as owned by individual ones of said other base stations and as avoided by said one base station other slots in which said individual ones of said other base stations interfere with said one base station, and to assign as shared by said one base station and another of said other base stations a shared slot in which said another of said other base stations interferes with said one base station if used simultaneously with said one base station and which are not assigned as owned by any of the base stations; and allocating on request a slot whose determined classification matches a desired quality class of the request.

8. The apparatus of claim 7, wherein each said slot is a time slot.

9. The apparatus of claim 7, further comprising a controller connected to each base station and configured to:

receive a report as a result of said determination for each base station and allocate the slot on request.

10. The apparatus of claim 9, wherein the controller is further configured to maintain an indication of which slots are allocated for each base station.

11. The apparatus of claim 10, wherein:

if neither an owned slot nor a shared slot of a first base station is available for a requested communication, the controller is configured to determine whether any avoided slot of the first base station is not in use by a second base station owning that slot, and if so, to allocate that slot for the requested communication.

12. The apparatus of claim 8, wherein the logic unit is configured to allocate a slot further according to location of a mobile station to be communicated with.

13. Apparatus comprising:

means for determining, for each base station of a plurality of base stations capable of communicating with at least one mobile station via any of a group of slots in a communication system, a classification for each slot of the group of slots according to a probability of interference with other base stations of the plurality of bases stations, said determining means comprising means for assigning as owned by one of said base stations and as avoided by other of said base stations a first slot in which said other base stations interfere with said one base station, assigning as owned by individual ones of said other base stations and as avoided by said one base station other slots in which said individual ones of said other base stations interfere with said one base station, and assigning as shared by said one base station and another of said other base stations a shared slot in which said another of said other base stations interferes with said one base station if used simultaneously with said one base station and which are not assigned as owned by any of the base stations; and means for allocating on request a slot whose determined classification matches a desired quality class of the request.

14. The apparatus of claim 13, where said determining means and said allocating means comprise part of a controller that is connected to said base stations.

15. The method of claim 1, where the desired quality class of transmission comprises a desired quality of service class.

16. The method of claim 1, where the desired quality class of transmission is considered for real-time transmission to be a high quality class, and for packet data transmission to be a lower quality class.

17. The apparatus of claim 7, where the desired quality class of transmission comprises a desired quality of service class.

18. The apparatus of claim 7, where the desired quality class of transmission is considered for real-time transmission to be a high quality class, and for packet data transmission to be a lower quality class.

19. The apparatus of claim 13, where the desired quality class of transmission comprises a desired quality of service class.

20. The apparatus of claim 13, where the desired quality class of transmission is considered for real-time transmission to be a high quality class, and for packet data transmission to be a lower quality class.

* * * * *